United States Patent
Harman

(10) Patent No.: US 7,862,302 B2
(45) Date of Patent: Jan. 4, 2011

(54) FLUID CIRCULATION SYSTEM

(75) Inventor: Jayden David Harman, San Rafael, CA (US)

(73) Assignee: Pax Scientific, Inc., San Rafael, CA (US)

( * ) Notice: Subject to any disclaimer, the term of this patent is extended or adjusted under 35 U.S.C. 154(b) by 0 days.

(21) Appl. No.: 11/429,412

(22) Filed: May 4, 2006

(65) Prior Publication Data

US 2006/0263201 A1 Nov. 23, 2006

Related U.S. Application Data

(63) Continuation of application No. PCT/AU2004/001388, filed on Oct. 12, 2004.

(60) Provisional application No. 60/517,244, filed on Nov. 4, 2003.

(51) Int. Cl.
*B63H 1/26* (2006.01)
*F01D 1/02* (2006.01)

(52) U.S. Cl. .............................. 416/223 R; 416/DIG. 2; 415/206

(58) Field of Classification Search .................. 415/72; 416/227 R, 231 A, 234; 417/36
See application file for complete search history.

(56) References Cited

U.S. PATENT DOCUMENTS

| | | |
|---|---|---|
| 11,544 A | 8/1854 | Andrews |
| 700,785 A | 5/1902 | Kull |
| 794,926 A | 7/1905 | Crawford |
| 871,825 A | 11/1907 | Schupmann |
| 879,583 A | 2/1908 | Pratt |
| 943,233 A | 12/1909 | Boyle |
| 965,135 A | 7/1910 | Gibson |
| 969,101 A | 8/1910 | Gibson |
| 1,023,225 A | 4/1912 | Shlosberg |
| 1,272,180 A | 7/1918 | Andresen |
| 1,353,478 A | 9/1920 | Jeffries |
| 1,356,676 A | 10/1920 | Weller et al. |
| 1,396,583 A | 11/1921 | Krafve |
| 1,471,697 A | 10/1923 | Kubes |
| 1,505,893 A | 8/1924 | Hunter et al. |
| 1,658,126 A | 2/1928 | Jehle |
| 1,667,186 A | 4/1928 | Bluehdorn |
| 1,709,217 A | 4/1929 | Hamilton |
| 1,713,047 A | 5/1929 | Maxim |
| 1,729,018 A | 9/1929 | Siders |
| 1,756,916 A | 4/1930 | Stranahan |

(Continued)

FOREIGN PATENT DOCUMENTS

AU B-62946/96 2/1997

(Continued)

OTHER PUBLICATIONS

Derwent Abstract Accession No. 97-198067/18, JP 09053787 A (Kajima Corp) Feb. 25, 1997.

(Continued)

*Primary Examiner*—Edward Look
*Assistant Examiner*—Dwayne J White
(74) *Attorney, Agent, or Firm*—Carr & Ferrell LLP

(57) ABSTRACT

A fluid circulation system wherein circulation is caused within a body by establishing a ring vortex within the fluid caused by an impeller designed in accordance with the Golden Section or Phi Geometry.

23 Claims, 7 Drawing Sheets

U.S. PATENT DOCUMENTS

| | | | |
|---|---|---|---|
| 1,785,460 A | 12/1930 | Schlotter | |
| 1,799,039 A | 3/1931 | Conejos | |
| 1,812,413 A | 6/1931 | Reynolds | |
| 1,816,245 A | 7/1931 | Wolford | |
| 1,872,075 A | 8/1932 | Dolza | |
| 1,891,170 A | 12/1932 | Nose | |
| 1,919,250 A | 7/1933 | Olson | |
| 2,068,686 A | 1/1937 | Lascroux | |
| 2,139,736 A | 12/1938 | Durham | |
| 2,165,808 A | 7/1939 | Murphy | |
| 2,210,031 A | 8/1940 | Greene | |
| 2,359,365 A | 10/1944 | Katcher | |
| 2,879,861 A | 3/1959 | Belsky et al. | |
| 2,908,344 A | 10/1959 | Maruo | |
| 2,912,063 A | 11/1959 | Barnes | |
| 2,958,390 A | 11/1960 | Montague | |
| 3,066,755 A | 12/1962 | Diehl | |
| 3,071,159 A | 1/1963 | Coraggioso | |
| 3,076,480 A | 2/1963 | Vicard | |
| 3,081,826 A | 3/1963 | Loiseau | |
| 3,082,695 A | 3/1963 | Buschhorn | |
| 3,215,165 A | 11/1965 | Broadway | |
| 3,232,341 A | 2/1966 | Woodworth | |
| 3,339,631 A | 9/1967 | McGurty | |
| 3,371,472 A | 3/1968 | Krizman, Jr. | |
| 3,407,995 A | 10/1968 | Kinsworthy | |
| 3,584,701 A | 6/1971 | Freeman | |
| 3,692,422 A | 9/1972 | Girardier | |
| 3,800,951 A * | 4/1974 | Mourlon et al. | 210/242.3 |
| 3,918,829 A | 11/1975 | Korzec | |
| 3,927,731 A | 12/1975 | Lancaster | |
| 3,940,060 A | 2/1976 | Viets | |
| 3,957,133 A | 5/1976 | Johnson | |
| 3,964,841 A | 6/1976 | Strycek | |
| 4,050,539 A | 9/1977 | Kashiwara et al. | |
| 4,182,596 A | 1/1980 | Wellman | |
| 4,206,783 A | 6/1980 | Brombach | |
| 4,211,183 A | 7/1980 | Hoult | |
| 4,225,102 A | 9/1980 | Rao et al. | |
| 4,299,553 A | 11/1981 | Swaroop | |
| 4,317,502 A | 3/1982 | Harris et al. | |
| 4,323,209 A | 4/1982 | Thompson | |
| 4,331,213 A | 5/1982 | Taniguchi | |
| 4,505,297 A | 3/1985 | Leech et al. | |
| 4,533,015 A | 8/1985 | Kojima | |
| 4,540,334 A | 9/1985 | Stähle | |
| 4,579,195 A | 4/1986 | Nieri | |
| 4,644,135 A | 2/1987 | Daily | |
| 4,679,621 A | 7/1987 | Michele | |
| 4,685,534 A | 8/1987 | Burstein et al. | |
| 4,699,340 A | 10/1987 | Rethorst | |
| 4,823,865 A | 4/1989 | Hughes | |
| 4,834,142 A | 5/1989 | Johannessen | |
| 4,993,487 A | 2/1991 | Niggemann | |
| 4,996,924 A | 3/1991 | McClain | |
| 5,010,910 A | 4/1991 | Hickey | |
| 5,040,558 A | 8/1991 | Hickey et al. | |
| 5,052,442 A | 10/1991 | Johannessen | |
| 5,058,837 A | 10/1991 | Wheeler | |
| 5,100,242 A | 3/1992 | Latto | |
| 5,139,215 A | 8/1992 | Peckham | |
| 5,181,537 A | 1/1993 | Powers | |
| 5,207,397 A | 5/1993 | Ng et al. | |
| 5,220,955 A | 6/1993 | Stokes | |
| 5,249,993 A | 10/1993 | Martin | |
| 5,261,745 A * | 11/1993 | Watkins | 366/250 |
| 5,312,224 A | 5/1994 | Batchelder et al. | |
| 5,337,789 A | 8/1994 | Cook | |
| 5,382,092 A | 1/1995 | Okamoto et al. | |
| 5,624,229 A | 4/1997 | Kotzur et al. | |
| 5,661,638 A | 8/1997 | Mira | |
| 5,741,118 A | 4/1998 | Shinbara et al. | |
| 5,787,974 A | 8/1998 | Pennington | |
| 5,844,178 A | 12/1998 | Lothringen | |
| 5,891,148 A | 4/1999 | Deckner | |
| 5,934,612 A | 8/1999 | Gerhardt | |
| 5,934,877 A | 8/1999 | Harman | |
| 5,943,877 A | 8/1999 | Chen | |
| 5,954,124 A | 9/1999 | Moribe et al. | |
| 6,050,772 A | 4/2000 | Hatakeyama et al. | |
| 6,179,218 B1 * | 1/2001 | Gates | 239/17 |
| 6,241,221 B1 | 6/2001 | Wegner et al. | |
| 6,273,679 B1 | 8/2001 | Na | |
| 6,374,858 B1 | 4/2002 | Hides et al. | |
| 6,382,348 B1 | 5/2002 | Chen | |
| 6,385,967 B1 | 5/2002 | Chen | |
| 6,415,888 B2 | 7/2002 | An et al. | |
| 6,484,795 B1 | 11/2002 | Kasprzyk | |
| 6,604,906 B2 | 8/2003 | Ozeki et al. | |
| 6,623,838 B1 | 9/2003 | Nomura et al. | |
| 6,632,071 B2 | 10/2003 | Pauly | |
| 6,669,142 B2 | 12/2003 | Saiz | |
| 6,684,633 B2 | 2/2004 | Jett | |
| D487,800 S | 3/2004 | Chen et al. | |
| 6,702,552 B1 | 3/2004 | Harman | |
| 6,817,419 B2 * | 11/2004 | Reid | 166/369 |
| 6,892,988 B2 | 5/2005 | Hugues | |
| 6,932,188 B2 | 8/2005 | Ni | |
| D509,584 S | 9/2005 | Li et al. | |
| 6,959,782 B2 | 11/2005 | Brower et al. | |
| 7,117,973 B2 | 10/2006 | Graefenstein | |
| D539,413 S | 3/2007 | Parker et al. | |
| 2002/0148777 A1 | 10/2002 | Tuszko et al. | |
| 2003/0012649 A1 | 1/2003 | Sakai et al. | |
| 2003/0190230 A1 | 10/2003 | Ito | |
| 2004/0037986 A1 | 2/2004 | Houston et al. | |
| 2004/0238163 A1 | 12/2004 | Harman | |
| 2004/0244853 A1 | 12/2004 | Harman | |
| 2005/0011700 A1 | 1/2005 | Dadd | |
| 2005/0155916 A1 | 7/2005 | Tuszko et al. | |
| 2005/0269458 A1 | 12/2005 | Harman | |
| 2006/0102239 A1 | 5/2006 | Harman | |
| 2006/0249283 A1 | 11/2006 | Harman | |
| 2007/0003414 A1 | 1/2007 | Harman | |
| 2007/0025846 A1 | 2/2007 | Harman | |

FOREIGN PATENT DOCUMENTS

| | | |
|---|---|---|
| DE | 003315258 | 10/1984 |
| EP | 14257 | 8/1980 |
| EP | 0 598 253 A1 | 5/1994 |
| FR | 2534981 | 10/1982 |
| FR | 2666031 A | 2/1992 |
| GB | 873136 | 7/1961 |
| GB | 2057567 A | 4/1981 |
| GB | 2 063 365 A | 6/1981 |
| JP | 05332121 | 12/1993 |
| JP | 00257610 | 9/2000 |
| JP | 2000257610 | 9/2000 |
| JP | D1243052 | 6/2005 |
| SU | 431850 | 8/1975 |
| SU | 858896 | 12/1979 |
| SU | 738566 | 6/1980 |
| SU | 850104 | 7/1981 |
| SU | 1030631 | 7/1983 |
| TW | 565374 | 3/2002 |
| TW | M287387 | 2/2006 |
| WO | WO 81/03201 | 11/1981 |
| WO | WO 87 07048 A | 11/1987 |
| WO | WO 89 08750 A | 9/1989 |
| WO | WO 00/38591 | 7/2000 |
| WO | WO 01 14782 | 3/2001 |
| WO | WO 03 0526228 A | 7/2003 |
| WO | WO 03056269 A1 * | 7/2003 |

WO PCT/AU2004/001388    5/2005

OTHER PUBLICATIONS

Derwent Abstract Accession No. 97-546288/50, JP 09264462 A (Sekisui Chem Ind Co Ltd) Oct. 7, 1997.
Derwent Abstract Accession No. 1999-380417/32, JP 11148591 A (TLV Co Ltd) Jun. 2, 1999.
Derwent Abstract Accession No. E6575C/21, SU 687306A (Leningrad Forestry Acad) Sep. 28, 1977.
Derwent Abstract Accession No. N8420 E/42, SU 887876 A (As Ukr Hydromechani) Dec. 7, 1981.
Derwent Abstract Accession No. 85-073498/12, SU 1110986 A (Korolev A S) Aug. 30, 1984.
Derwent Abstract Accession No. 89-075095/10, SU 1418540 A (As Ukr Hydrodynamic) Aug. 23, 1988.
Derwent Abstract Accession No. 91-005279, SU 1560887 A (Sredaztekhenergo En) Apr. 30, 1990.
Derwent Abstract Accession No. 93-375668/47, SU 1756724 A (Odess Poly) Aug. 30, 1992.
Derwent Abstract Accession No. L0015B/47, SE 7803739 A (Ingenjorsfirma Garl). Nov. 5, 1979.
Derwent Abstract Accession No. 87-318963/45, SU 1291726 A (Makeevka Eng Cons) Feb. 23, 1987.
Derwent Abstract Accession No. 99-249047/32, JP 11072104 A (Saito Jidosha Shatai Kogyo KK) Mar. 16, 1999.
Derwent Abstraction Accession No. 89157673, SU 1437579A (Lengd Kalinin Poly) Nov. 15, 1988.
Patent Abstracts of Japan, Publication No. 2000-168632, Jun. 20, 2000, "Low Air Resistance Vehicle Body Using Vortex Ring."
Karassik.et al., "Pump Handbook," published 1976 by McGraw-Hill, Inc.
Dr. Knott, Ron, "The Golden Section Ratio: Phi," Available at http://www.mcs.surrey.ac.uk/Personal/R.Knott/Fibonacci/phi.html (last accessed Oct. 3, 2006).
K. Foster et al., "Fluidics Components and Circuits," Wiley-Interscience, London, 1971, pp. 219-221.
McLarty, W., et al., "Phi Geometry: Impeller & Propeller Design for Fluids Handling," Oct. 1999, Offshore Magazine, pp. 123 (and continued).
Derwent Abstract Accession No. K2273W/37, SU 431850 A (Fishing Ind Exp), (Apr. 1975).
Derwent Abstract Accession 51960 E/25, SU 858896 A (Onatskii P A), (Aug. 1981).
Batchelor, G. K., "An Introduction to Fluid Dynamics", Cambridge Mathematical Library, 2000.
Merriam-Webster Online Dictionary, 2010 http://www.merriam-webster.com/dictionary/spiral, Feb. 23, 2010, two pages.
Merriam-Webster Online Dictionary, 2010 http://www.merriam-webster.com/dictionary/curve, Feb. 23, 2010, two pages.
Merriam-Webster Online Dictionary, 2010 http://www.merriam-webster.com/dictionary/vortex, Feb. 23, 2010, two pages.
Merriam-Webster Online Dictionary, 2010 http://www.merriam-webster.com/dictionary/vortical, Feb. 23, 2010, two pages.
The CAD Guidebook, A Basic Manual for Understanding and Improving Computer Aided Design, Stephen J. Schoonmaker, Marcel Decker, Inc., New York 2002.

* cited by examiner

FLUID CIRCULATION SYSTEM

The present application is a continuation and claims the priority benefit of Patent Cooperation Treaty application number PCT/AU2004/001388 filed on Oct. 12, 2004, which claims the priority benefit of U.S. provisional patent application number 60/517,244 filed in the United States of America on Nov. 4, 2003. The disclosures of the aforementioned applications are incorporated herein by reference.

FIELD OF THE INVENTION

The present invention relates to the field of fluid mechanics and more particularly to the circulation within a body of fluid. More particularly, this invention seeks to provide an improved system of circulation within a body of fluid.

BACKGROUND ART

There are many applications wherein it is desirable to cause circulation within a body of fluid. Common reasons for providing circulation are for mixing, to prevent stratification and to aerate a body of liquid. Examples of these will be discussed later within this specification.

A large number of methods have been devised to cause the desired circulation. In one example, in the case of liquids, it is common to hold the liquid body within a cylindrical tank having its central axis oriented vertically and to cause the liquid to be moved within the tank by the action of an impeller driven by a motor. Many other means have been devised to cause the body of liquid to rotate. Nevertheless, these techniques require the expenditure of significant energy and often give rise to associated problems. Many of these inefficiencies and problems arise because such systems have not been designed to cause the fluid to be circulated in accordance with the natural flow tendencies found in nature.

In nature, fluid flow is essentially turbulent or vortical. A vortex ring cross-sectionally rolls, much like a wheel, rather than slides. Famed hydrodynamisist, Reynolds once stated, in reference to ring vortices, that "Nature prefers to roll rather than glide".

It is this feature that greatly contributes to ring vortex efficiency.

DISCLOSURE OF THE INVENTION

This invention is specifically designed to cause circulation of fluid within a fluid body in the form of vortices and preferably, single or multiple vortex rings.

Accordingly, the invention resides in a fluid circulation system adapted to be operative upon a contained body of fluid, the fluid circulation system comprising an impeller positioned within the body of fluid, the impeller formed to be able to establish and maintain substantially the whole of the body of fluid in circulation as a ring vortex by rotation of the impeller.

According to a preferred feature of the invention, the circulation is caused by means of the rotation of an impeller located within the fluid.

According to a preferred feature of the invention, the impeller is designed in accordance with the Golden Section or Phi geometry.

According to a preferred feature of the invention, the impeller is designed substantially in accordance with the Golden-Section-like centre or parts of a volute or other seashell.

According to a preferred feature of the invention, the form of the impeller corresponds with the flow lines, streamlines, or lines of vorticity within the funnel or central section of the ring vortex.

According to a preferred feature of the invention, the impeller is provided with an active surface having a configuration substantially conforming to at least one logarithmic curve of the Golden Section According to a preferred embodiment, the active surface substantially conforms to the Golden Section along the X-axis or along the Y-axis or along the Z-axis. According to a preferred embodiment, the active surface substantially conforms to the Golden Section along two of the X and Y and Z axes. According to a preferred embodiment, the active surface substantially conforms to the Golden Section along the X, Y and Z axes.

According to a preferred embodiment, the fluid body comprises a body of liquid in a substantially cylindrical tank oriented with its central axis disposed upwardly, wherein the impeller is positioned within the liquid to rotate about an axis of rotation substantially co-axially aligned with the central axis of the tank.

According to a further aspect, the invention resides in a mixing system for a body of liquid contained within a tank, the system comprising an impeller of the type described above wherein the impeller is positioned within the liquid to cause circulation of the liquid within the tank to be in the form of a ring vortex. According to a preferred embodiment, the tank is substantially cylindrical and oriented with its central axis disposed upwardly and the impeller is oriented to rotate about an axis of rotation substantially co-axially aligned with the central axis of the tank.

According to a preferred embodiment, the impeller may be mounted substantially horizontally.

According to a preferred embodiment, the base of the cylindrical tank is curved.

According to a preferred embodiment, the base of the cylindrical tank is a spherical section.

According to a preferred embodiment, the tank may be other than cylindrical.

According to a further aspect, the invention resides in a water remediation system adapted for a reservoir of water, the water remediation system comprising an impeller of the type previously described adapted to be positioned to rotate within the water to thereby establish and maintain circulation of the water in the form of a ring vortex.

According to a preferred feature of the invention, the axis of rotation of the impeller is upwardly disposed.

According to a preferred embodiment, the axis of rotation of the impeller is substantially vertical.

According to a preferred embodiment, the reservoir of water is a water tower associated with a reticulated supply and the circulation of water is adapted to disrupt or prevent the formation of stratification within the water body.

According to a preferred embodiment, the reservoir of water is a pond and the circulation of water is adapted to promote aeration of the whole body of water.

According to a preferred embodiment, the body of fluid is a gas.

The invention will be more fully understood in the light of the following description of several specific embodiments.

BRIEF DESCRIPTION OF THE DRAWINGS

The description is made with reference to the accompanying drawings, of which.

DETAILED DESCRIPTION OF SPECIFIC EMBODIMENTS

The applicant has previously disclosed rotors designed in accordance with the principles of nature in U.S. Pat. No. 5,934,877 as well as international publication numbers WO 01/38697 and 03/056139. The rotors of each of the embodiments described in those specifications are generally designed in all respects, substantially in accordance with the Golden Section or the Golden-Section-like centre or parts of a volute or other seashell and therefore it is a characteristic of each of the embodiments that the rotor provides a fluid pathway which is of a spiraling configuration and which conforms at least generally to the characteristics of the Golden Section. While it was envisaged that the rotors disclosed in these specifications would be suitable for use in pumps, turbines, fans, propellers and the like, it has been discovered that where at least certain embodiments are permitted to rotate at a fixed location in a body of fluid, the fluid is caused to circulate and that after a short period of time, the circulation will take the form of a ring vortex.

Figure 1:
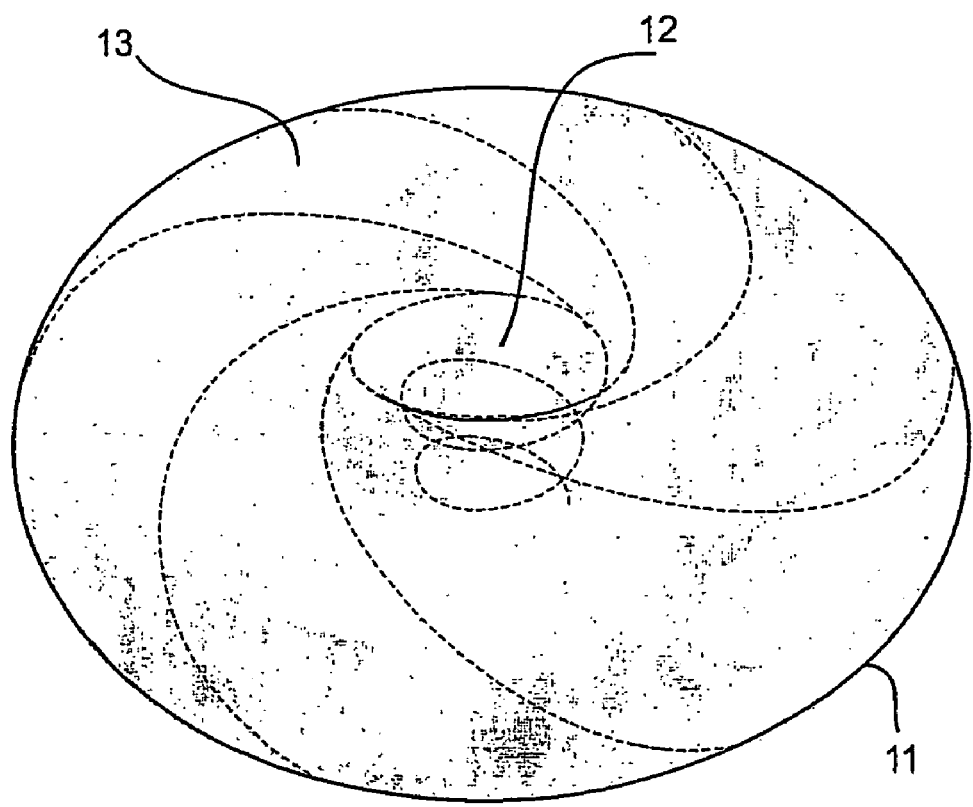
FIG. 1 is a diagrammatic representation of a ring vortex.

A ring vortex is a mechanism with interesting properties and an example is diagrammatically illustrated in FIG. 1. In a free environment, the ring vortex 11 has a doughnut shape with a central funnel region 12. The vortex lines 13 attempt to give an impression of the fluid flow within the ring vortex although it must be appreciated that this is impossible via a two dimensional illustration. A smoke ring is an example of a ring vortex. Once established, a ring vortex requires very little energy input to maintain it indefinitely. It also has a flow structure wherein the fluid flow is slowest at the outer perimeter. Thirdly, because of its peculiar, multi-directional flow, it is highly effective and efficient at mixing the fluid. Advantage is taken of these properties in the embodiments described below.

It can also reach a resonance point and accumulate energy which thereby, over time, may reduce the energy input required to maintain the ring vortex.

Each of the embodiments of the present invention comprises a system for inducing within a body of fluid a circulation that follows the path of a ring vortex. A ring vortex is nature's preferred, most common, most efficient manner of circulatory flow of a fluid. It is a mechanism that is highly efficient compared with other patterns of flow and has several advantageous properties, as are discussed above.

Once found, its inertia becomes integrally part of the "flow device" comprising the liquid flow field and impeller with all sharing the same geometry of movement that is essentially a radial laminar flow path.

While it is possible to induce a body of fluid to circulate as a ring vortex in a number of different ways, it is a common feature of the embodiments that they are caused to circulate by means of an impeller designed in accordance with the principles disclosed by the applicant in his previous applications as mentioned above, having surfaces designed in accordance with the Golden Section. It is a characteristic of such an impeller that the curvatures of the surfaces, which form the impeller, take a two-dimensional or three-dimensional form which substantially conforms with the characteristics of the "Golden Section" and any variation in cross-sectional area also conforms substantially to the characteristics of the "Golden Section".

Figure 2A:
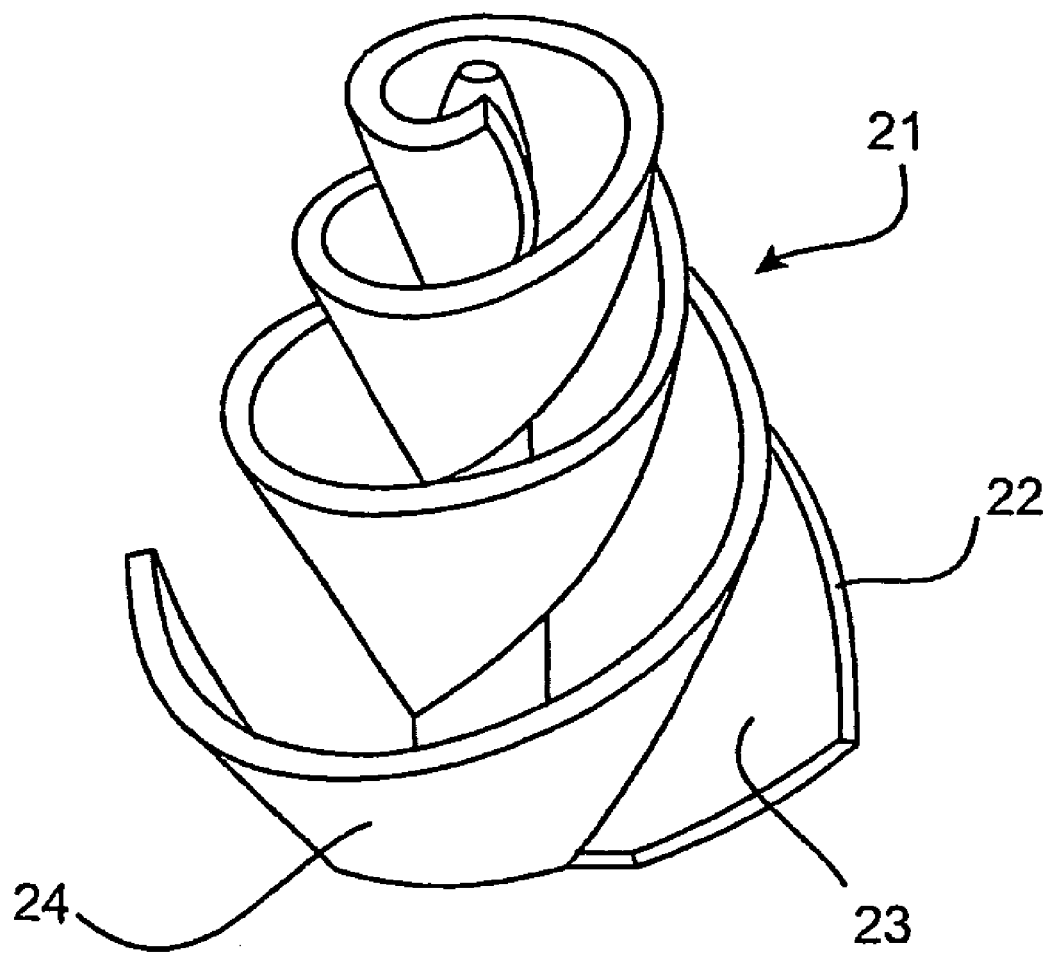
FIG. 2a is an isometric view of an impeller, typical of those used in the embodiments.
Figure 2B:
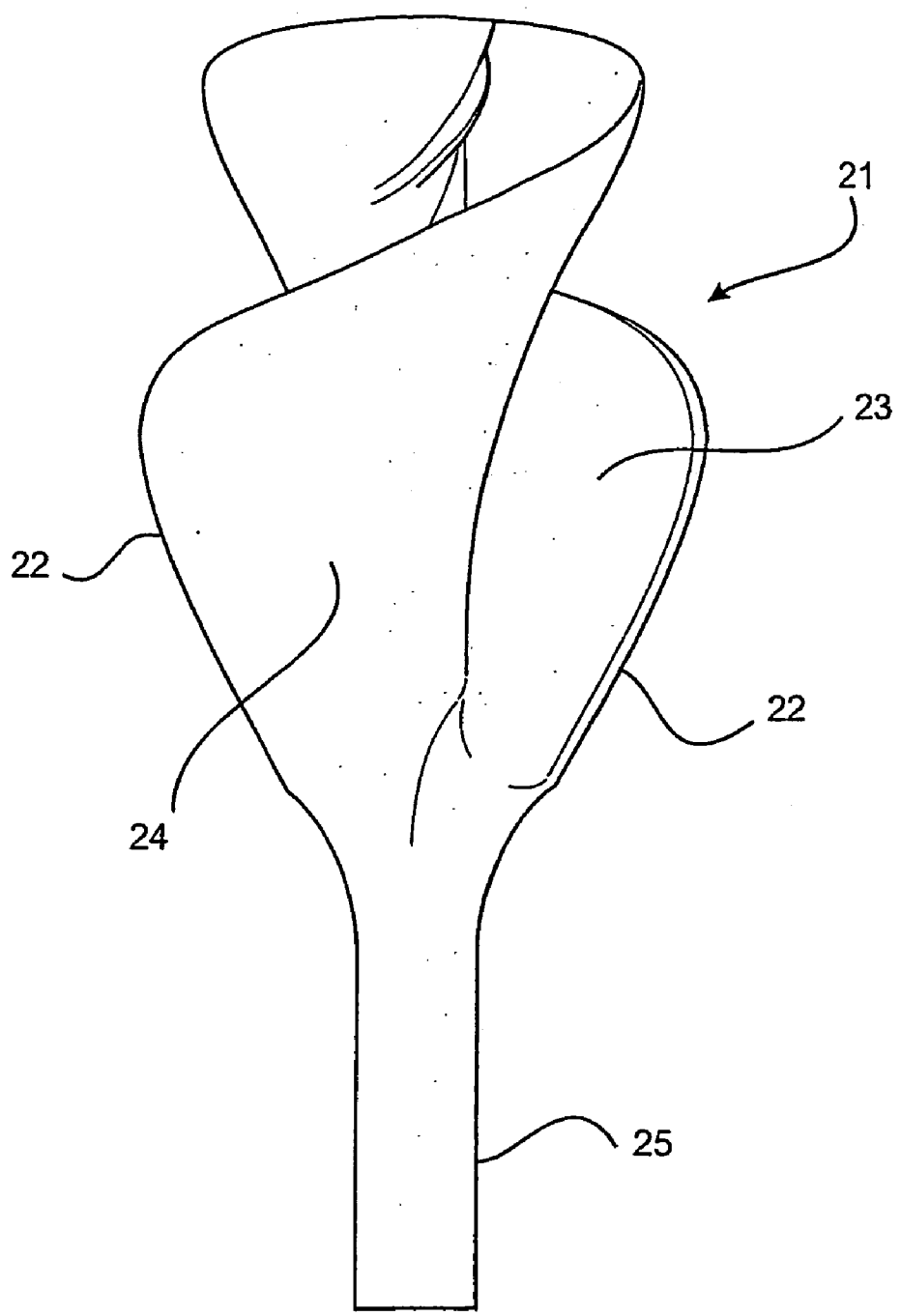
FIG. 2b is a side elevation of an alternative impeller to that shown in FIG. 2a typical of those used in the embodiments.

Examples of impeller that has been found to be particularly suitable shown in FIGS. 2a and 2b. In these, this impeller is designed in the form of a whorl and comprises an impeller 21 having twin vanes 22 which have a helical configuration with active surfaces 23 and 24 substantially conforming to that of the "Golden Section" and which is adapted to be supported upon a central shaft 25 to be driven by a motor. The configuration of the vanes of these impellers correspond to the lines of vorticity of the central or "funnel" portion of a ring vortex and it is this fact that makes such an impeller effective in producing a ring vortex. It should be noted that alternative configurations of the impeller may also be used, such as an impeller with a single vane, or multiple vanes with active surfaces configured substantially in accordance with the Golden Section. These active surfaces may substantially conform to the Golden Section along the X-axis or along the Y-axis or along the Z-axis, along two of the X and Y and Z axes, or along the X, Y, and Z axes.

Figure 3:
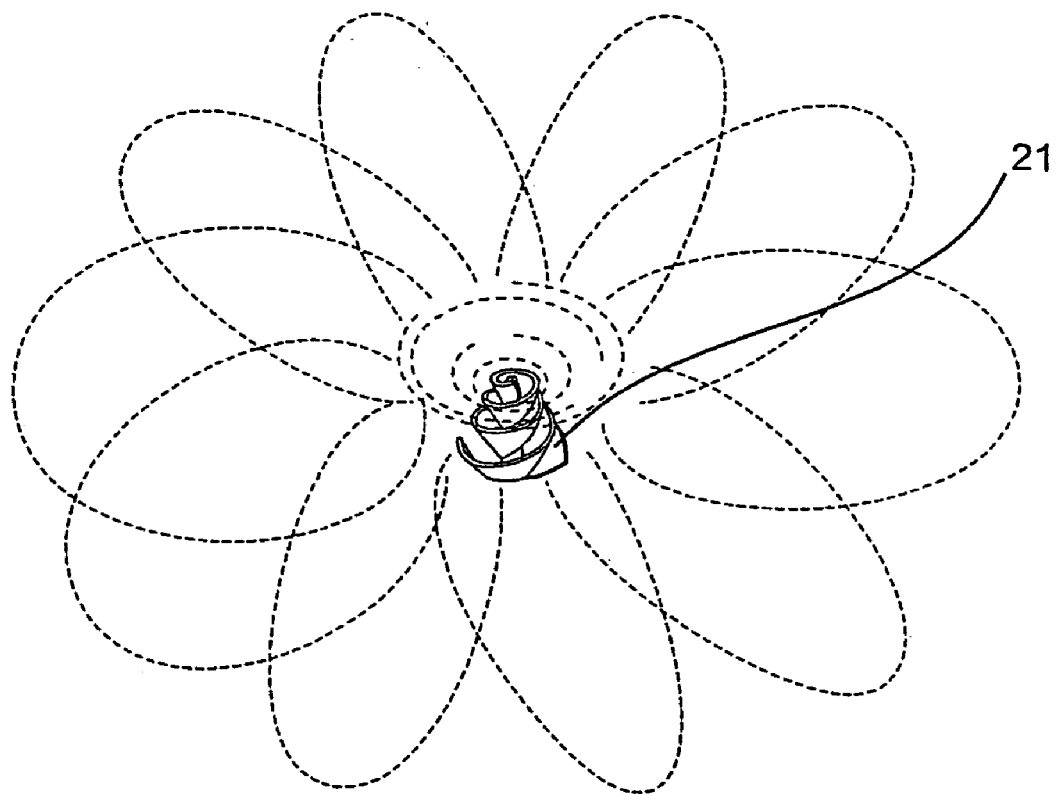
FIG. 3 is a diagrammatic representation of the interaction of the impeller of FIG. 2a with a body of fluid as it rotates, in accordance with the embodiments.

When the impeller is first caused to rotate within a body of fluid, it induces both an axial flow to the fluid and a rotational flow. Initially, the impeller creates a high degree of turbulence as the body of fluid is initially stationary. However, as the impeller is allowed to operate for a little time, the fluid is caused to circulate, as indicated diagrammatically in FIG. 3. Because the impeller is designed to conform to the natural flow of the fluid, a progressively higher proportion of energy input by the impeller is imparted to the fluid as kinetic energy rather than turbulence as the fluid body accelerates and the fluid is thereby induced to flow in its natural way which is in the form of a ring vortex. Once the ring vortex is established sufficiently, the impeller shows little or no tendency to cause cavitation over a wide range of operating speeds. This is in contrast to a conventional impeller where the operation at a speed above its designed level rapidly leads to cavitation.

Figure 4:
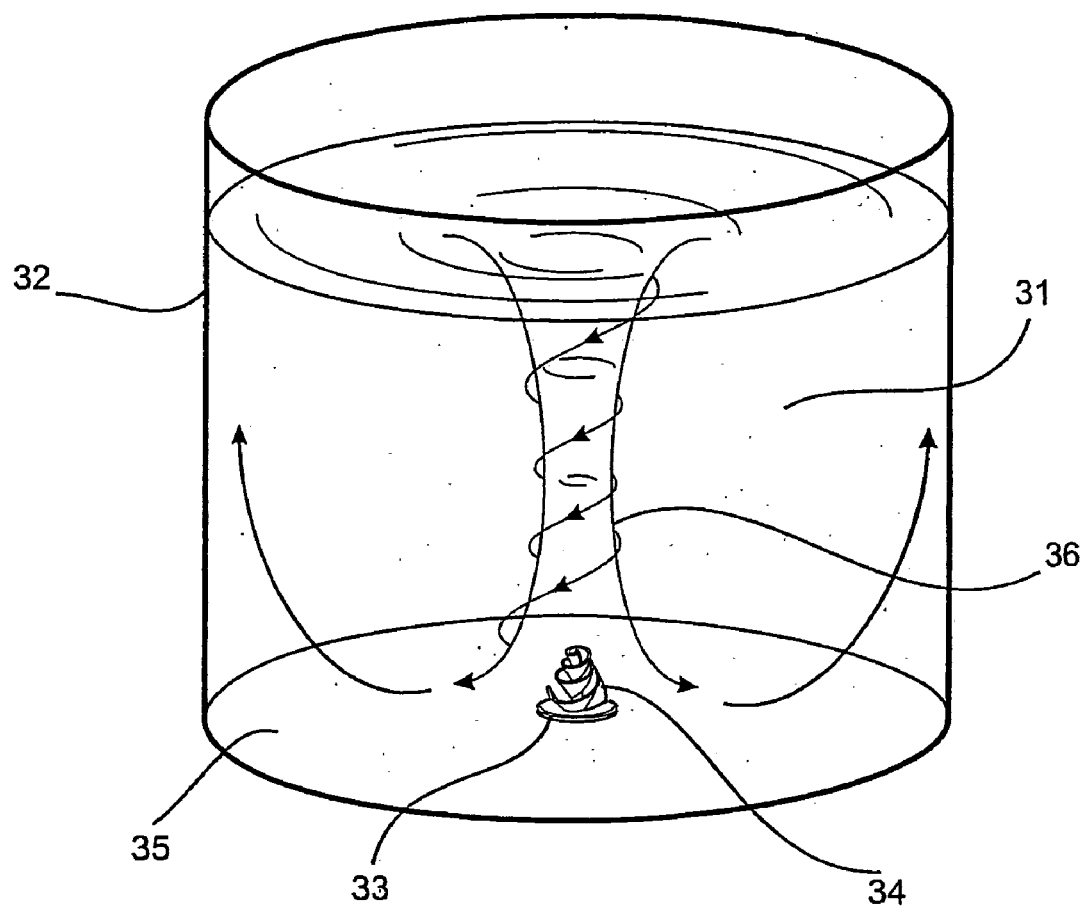
FIG. 4 is a diagrammatic view of a tank of liquid being circulated by the impeller of FIG. 2a in accordance with the first embodiment.

In the first embodiment of the present invention as diagrammatically represented in FIG. 4 there is depicted a body of liquid 31 held in a cylindrical tank 32, the tank 32 being oriented with its central axis vertical. Within the tank 32, there is mounted a submersible motor 33 having an impeller 34, the axle of the motor and impeller being substantially co-axially aligned with the central axis of the tank 32. The motor 33 may be conveniently mounted to the base of the tank 35. As mentioned above, the impeller 34 is designed so that its active surfaces conform to the Golden Section as shown in FIG. 2a or FIG. 2b. Operation of the impeller 34 causes the fluid to circulate as a ring vortex and indicated by the flow lines 36, as discussed above. If the liquid 31 is a mixture which must be mixed homogeneously, such mixing is achieved efficiently.

The advantages of the present system will be better appreciated by a comparison with a conventional mixing system of similar arrangement. Such a system again uses a cylindrical tank having a motor driving an impeller. However, the impeller of such a system is designed to cause the body of liquid to rotate about the central axis of the tank. This results in a number of problems.

In such a system, the speed of liquid flow is greatest at the perimeter of the fluid body, that is, at the wall of the tank. As a result, considerable energy is expended due to frictional losses in moving the liquid relative to the wall. In contrast, in a ring vortex, the speed of liquid flow is at its lowest at the perimeter, that is, at the tank wall, so that frictional losses are minimised. Also as a result of rotating flow in conventional systems, the water tends to "climb up" the wall, at the perimeter as a result of the "centrifugal" force. When fluid flow is in accordance with a ring vortex as in the case of the embodiments, the surface level remains substantially constant, around the edges. It is to be noted that, while in both cases, the water level is reduced at the centre, the fluid dynamics involved is very different. It should be noted that, at least in a relatively small tank, once the ring vortex is established and excessive power is input it is possible to establish a rotating wave which circulates around the surface of the liquid. The fluid dynamics of this wave motion are not yet fully understood but it is to be recognized that it is the wave that rotates, not the liquid itself. In addition, mixing is inefficient in a conventional system. In such a system, once rotational motion is established, the liquid tends to rotate as a fixed mass like a wheel with little relative movement within the liquid. This is known as solid body rotation. Mixing must be continued for a relatively long time. In contrast, relative fluid movement is inherent within a ring vortex and mixing time is minimised.

The conventional mixing process requires substantial power to get it started. This requires that the motor be sized accordingly. In certain chemical and pharmaceutical mixing processes, it is necessary to mix large batches of material over a prolonged period, in the order of one month. It has been found that in some cases, if the process is stopped before the completion of mixing, for instance due to power failure, it has been found impossible to restart the process because of limiting start-up inertia. The motor is not powerful enough to restart so that the whole batch must be scrapped. The other alternative, historically, is to fit a larger motor in the first place. Obviously, this results in considerable economic loss. In contrast, mixing by means of the present invention does not require excess power for starting. The ring vortex is an energy reservoir. As energy is added, it is stored in the vortex ring. Therefore, at starting, energy is added in progressively, until the ring vortex is functioning at a level such that the energy dissipated in losses in the system is similar to the energy being input.

Clearly, in any real system some losses will exist. In a simple example of the embodiment, where the tank is of cylindrical shape, it is believed that some losses occur because of the abrupt change between the floor and the wall. It is believed that such losses are reduced by providing a tank with a curved base, such as a spherical section, rather than a flat base. Nevertheless, even in a standard cylindrical tank, an effective ring vortex can be established with high efficiency. Indeed, it is quite possible to establish fluid flow in the form of a ring vortex even in a tank which is non-cylindrical, even of very irregular shape.

It is a peculiar characteristic of the system that a ring vortex will be established whether the liquid is made to rise at the centre or whether it is made to fall, with only the direction of internal flow of the ring vortex being reversed. It is believed that there may be some applications where flow in a particular of the two directions may be slightly advantageous.

It is also believed that there are applications, particularly in relatively shallow tanks where the performance will be improved by an appropriate positioning of the impeller between the base and the liquid surface.

Figure 5:
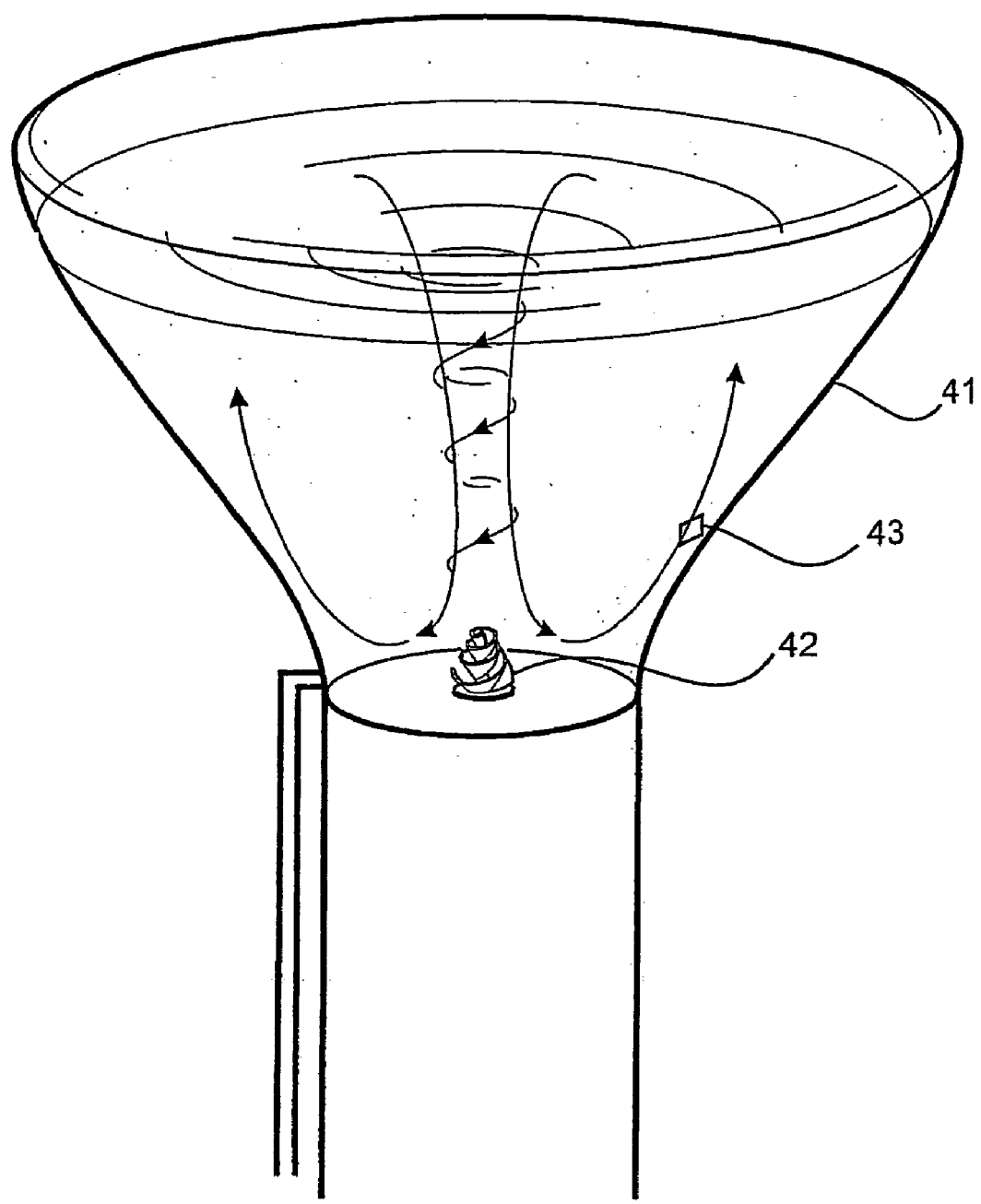
FIG. 5 is a diagrammatic view of a water tower being circulated by the impeller of FIG. 2a in accordance with the second embodiment.

In a second embodiment as shown in FIG. 5, there is provided a water remediaton system for a water tower of the type used in water reticulation systems for municipal supplies. Water towers are widely used by water authorities as a means to provide an adequate supply of water at the desired pressure during periods of peak demand. During non-peak periods, water is pumped by a pumping station, with a portion of the water meeting the demand and a portion being pumped into an elevated water tower. During peak periods when the demand exceeds the capacity of the pumping system, additional supply is obtained from the water tower. It is normal design with such towers for water to be input and withdrawn through the same pipe which is connected at or near the floor of the water storage. However, this leads to a problem. Through much of the year, the volume of water added to the tank and withdrawn from the tank is only a small proportion of the total capacity. At least in the warmer months, it is normal for water to be warmed above the temperature of the water being provided by the supply. Water which is added to the tank at such times is added at the base of the tank, and, as it is cooler than the general body of water in the tank, will remain adjacent to the base of the tank. When water is removed from the tank it is the cool water at the base of the tank which is removed first. As a result, stratification of the water body occurs and the water in the upper levels of the tank is not circulated, nor withdrawn and replaced by fresh water, as is the case for the lower water. This stagnation results in the upper water fouling. To prevent such fouling, supply authorities have found it necessary to add chemicals, which is relatively expensive and also undesirable from the perspective of water quality. Alternatively pumps or paddle agitators can be used but are far less efficient than this invention as they create turbulent flow instead of a primary ring vortex.

According to the second embodiment, an impeller 42 of the type described with respect to the first embodiment and driven by a suitable motor is positioned centrally within the water tower 41, the rotational axis of the impeller 42 and motor being aligned vertically. The impeller 42 may be positioned at a relatively low level within the water body so as to be operable without problem when the water level is low. A level switch 43 is provided within the circuitry of the motor to isolate the motor when the water level in the water tower 41 drops too low, thereby preventing the motor from operating when the impeller 42 is not covered by water. As a result of the operation of the impeller 42, a ring vortex will be established within the water body, ensuring circulation of the water held within the water tower at very low power consumption levels. Due to this circulation, stratification of the water will either be prevented or dispersed. As a result of the efficiencies of the ring vortex and in the impeller designed substantially in accordance with the Golden Section, it is expected that a motor of power in the range of 20 watts to 100 watts will be adequate for most water towers. The expense of operating such a motor is considerably less than the cost of adding chemicals to control the fouling. The power use is so low that solar power is an economic option.

Figure 6:
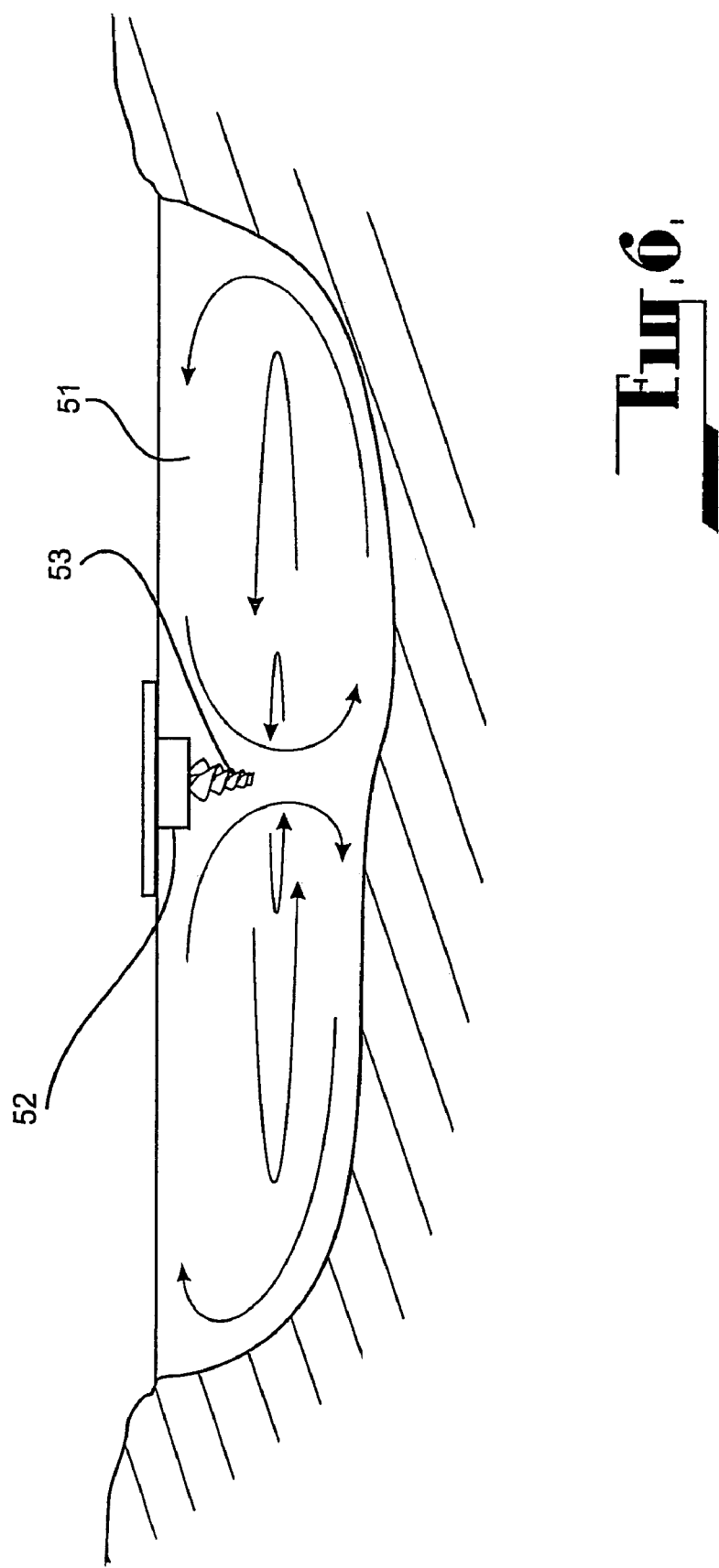
FIG. 6 is a diagrammatic view of pond of liquid being circulated by the impeller of FIG. 2a in accordance with the third embodiment.

In a third embodiment as shown in FIG. 6, there is provided a water remediation and/or maintenance system for a pond, such as may be found in municipal parks. It is well known that such ponds suffer fouling due to lack of aeration which results in the death of fish and aerobic plants and the build up of unpleasant mould, fungi, botulism, and mosquito breeding. With a still pond, water stratifies with the cold water remaining at the bottom and the warmer water at the top which accentuates the problems. Attempts to reduce the fouling by aeration or other means have been only partially effective because they do not fully circulate the water but rather rely on diffusion of compressed air into the stagnant lower layers. Because of the stratification, this diffusion is not very successful.

In the third embodiment, a pond 51 is provided with a small motor 52 driving an impeller 53 of the type described for the first embodiment. The motor 52 is located approximately in the centre of the pond 51 with its axis vertical and the impeller 53 submerged somewhat in the pond water. Water circulation is established by running the motor 52 continuously. In doing so, after some time, fluid flow adopts the pattern of a ring vortex. As a result, the pond water circulates and mixes the whole body of water of the pond 51. The circulation removes the stratification and results in the aerated surface layer being continuously mixed with all other water, thereby providing aeration to the total water body. These advantages displayed by the embodiment are realized with a motor of very small, relative size. In testing, rejuvenation of a pond having a surface area of approximately one acre (1.7 million gallons) was achieved within two weeks by operation of a motor of 40 watts. It is believed that even lower power will be required to maintain the pond in a healthy state. If this power is provided from mains supply, the electrical cost would be less than $50.00, annually, significantly less and more effective than applying chemical treatments. In addition, while the circulation will effect the whole pond, due to the nature of fluid flow within the ring vortex, the flow at the perimeter of the pond will be very slow and indeed, almost imperceptible to the naked eye. Thus, the fluid circulation will not cause an erosion problem about the pond edges.

In an alternative test, a one-half acre, 16-foot deep, million-gallon water supply reservoir was fully mixed in 20 hours with a 24-watt motor.

In one adaptation of the third embodiment, the motor and impeller assembly could be mounted to a stand which also supports a photoelectric panel to provide the power to drive the motor. This arrangement could be combined with a battery to provide continuous flow. Alternatively, it is believed that the water will be maintained at a satisfactory quality level in many environments by operation of the impeller intermittently, only when there is sufficient sunlight to drive the motor. By this arrangement, the need to provide mains electrical power supply to an installation in the centre of a large body of water is removed.

In another adaptation of the third embodiment, the motor, impeller and photoelectric panel are supported by a floatation device and the whole assembly moored to the pond floor by a suitable anchoring device. Such an arrangement would be suitable for a relatively deep pond, where it was impractical to support the assembly from the pond floor, or in a pond in which the level of water fluctuates significantly.

It should be noted that, in the case of the embodiments, while the best performance can be expected to be achieved when the impeller is positioned centrally relative to the pond or to the vertical axis of the tank or the water tower, it has been found that the systems operate effectively even when the funnel portion of the ring vortex is disposed significantly away from the respective central feature.

In the case of the various forms of the third embodiment, it will be recognized that the many ponds have a shape in plan that is very irregular. Indeed in some cases, the pond may comprise two or more main pools linked by a relatively narrow channel. It will be recognized that in these circumstances, it may be appropriate to operate more than one impeller, positioned to establish more than one vortex. It will be important in such situations to ensure that the vortices cooperate with each other by creation of vortices having correct rotations.

A further application of the third embodiment is in relation to a fish farm. The relatively low water speed across most of the pond, except in the vicinity of the funnel region while providing a high level of circulation and aeration make the embodiment an ideal environment for the farming of fish. Interestingly, it has been observed that fish will even pass through the funnel portion of the ring vortex without any noticeable distress.

The impeller expands logarithmically from inlet to outlet and thereby provides the following unique benefits: it will not harm fish and other organisms and does not easily foul from weeds or plastics as other conventional devices do.

The thorough circulation and excellent aeration of the fluid body as demonstrated in the third embodiment also render the process most suitable for sewerage treatment facilities. In each of the embodiments described, if the impeller is rotated at higher speeds it creates a vortex evacuation tube in the centre of the liquid movement. It will draw this tube of air right down to the impeller and vigorously disperse air throughout the liquid in an efficient and homogeneous way. This is a very inexpensive way to aerate liquids and has particular relevance to sewerage treatment, fish farms and many industrial applications.

It has been found that, in the various embodiments described above, the height and width of the ring vortex can be controlled by adjusting the stagger angle of the impeller.

In certain applications, it has been found desirable to produce the ring vortex by positioning the impeller to rotate about a substantially horizontal axis. Indeed, a ring vortex can be set up with the axis of the impeller oriented at other angles, intermediate vertical and horizontal. The application will determine the optimum angle.

The above embodiments identify but a few of the potential applications to which the invention may be adapted. By making use of the ring vortex, the applications get the benefits derived from using the natural flow pattern. It should be appreciated that the scope of the present invention need not be limited to the particular scope of the embodiments described above.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A fluid circulation system, comprising:
   an impeller that establishes and maintains ring vortex circulation in at least a part of a contained fluid body as a result of the rotation of the impeller, the impeller including twin vanes configured as a helix and inducing the ring vortex during rotation, and wherein at least a portion of the surface of the impeller conforms to a logarithmic spiral, the radius of the logarithmic spiral unfolding at a constant order of growth when measured at equiangular radii; and
   a motor positioned within the contained fluid body and coupled to the impeller, wherein the motor rotates the impeller about a vertically shared rotational axis.

2. The fluid circulation system of claim 1, wherein the fluid body is contained in a cylindrical tank.

3. The fluid circulation system of claim 2, wherein the cylindrical tank includes a curved base.

4. The fluid circulation system of claim 2, wherein the motor is mounted to the base of the cylindrical tank.

5. The fluid circulation system of claim 1, wherein the fluid body is contained in a non-cylindrical tank of an irregular shape.

6. The fluid circulation system of claim 1, wherein the fluid body is contained in a water tower.

7. The fluid circulation system of claim 1, wherein the motor includes a level switch that deactivates the motor and prevents operation of the motor when the contained fluid body drops below a certain level, and wherein the certain level of the contained fluid body corresponds to the impeller being submerged within the contained fluid body.

8. The fluid circulation system of claim 1, wherein the ring vortex circulation circulates an aerated surface layer of the contained fluid body with a stratified lower layer of the contained fluid body.

9. The fluid circulation system of claim 8, wherein the temperature of the aerated surface layer is warmer than the stratified lower layer of the contained fluid body.

10. The system of claim 1, wherein the ring vortex includes a multi-directional flow structure, the flow structure being slowest at the outer perimeter of the ring vortex.

11. A fluid circulation system, comprising:
a floatation device configured to rest on the surface of a contained fluid body;
an impeller coupled to the floatation device, the impeller including twin vanes configured as a helix and establishing and maintaining ring vortex circulation in at least a part of the contained fluid body as a result of the rotation of the impeller, the ring vortex circulation circulating an aerated surface layer of the contained fluid body with a stratified lower layer of the contained fluid body, wherein at least a portion of the surface of the impeller conforms to a logarithmic spiral that induces the ring vortex during rotation, the radius of the logarithmic spiral unfolding at a constant order of growth when measured at equiangular radii; and
a motor coupled to the impeller and the floatation device, wherein the motor rotates the impeller about a vertically shared rotational axis.

12. The fluid circulation system of claim 11, wherein the floatation device is anchored to the floor of the contained fluid body.

13. The fluid circulation system of claim 11, wherein the temperature of the aerated surface layer is warmer than the stratified lower layer of the contained fluid body.

14. The system of claim 11, wherein the motor is positioned with the contained fluid body.

15. The system of claim 14, wherein the motor includes a level switch that deactivates the motor and prevents operation of the motor when the contained fluid body drops below a certain level.

16. The system of claim 11, wherein the motor is powered by a photoelectric panel coupled to the floatation device.

17. The system of claim 11, wherein the ring vortex includes a multi-directional flow structure, the flow structure being slowest at the outer perimeter of the ring vortex.

18. A method for fluid circulation, comprising:
generating ring vortex circulation in at least a part of a contained fluid body, wherein the vortex is generated by an impeller submerged within the contained fluid body and caused to rotate about a vertically shared rotational axis by a motor, the impeller including twin vanes configured as a helix and at least a portion of the surface of the impeller conforming to a logarithmic spiral that induces the ring vortex during rotation, the radius of the logarithmic spiral unfolding at a constant order of growth when measured at equiangular radii.

19. The method of claim 18, wherein the ring vortex circulation circulates an aerated surface layer of the contained fluid body with a stratified lower layer of the contained fluid body.

20. The method of claim 19, wherein the temperature of the aerated surface layer is warmer than the stratified lower layer of the contained fluid body.

21. The method of claim 18, wherein the ring vortex includes a multi-directional flow structure, the flow structure being slowest at the outer perimeter of the ring vortex.

22. A fluid circulation system, comprising:
an impeller positioned within a contained fluid body, the impeller including twin vanes configured as a helix and establishing and maintaining ring vortex circulation in at least a part of the contained fluid body as a result of the rotation of the impeller, wherein at least a portion of the surface of the impeller conforms to a logarithmic spiral that induces the ring vortex during rotation, the radius of the logarithmic spiral unfolding at a constant order of growth when measured at equiangular radii; and
a motor coupled to and causing the impeller to rotate about a vertically shared rotational axis.

23. The system of claim 22, wherein the ring vortex includes a multi-directional flow structure, the flow structure being slowest at the outer perimeter of the ring vortex.

* * * * *